(12) United States Patent
Carlie et al.

(10) Patent No.: US 10,165,735 B1
(45) Date of Patent: Jan. 1, 2019

(54) DYNAMIC PLANT LIGHTING SYSTEMS AND METHODS

(71) Applicant: Full Spectrum Industries Corp., Loveland, CO (US)

(72) Inventors: Nathan Carlie, Loveland, CO (US); Todd Jaeger, Loveland, CO (US); Brad Lewis, Loveland, CO (US); Matthew Morgan, Loveland, CO (US)

(73) Assignee: Full Spectrum Industries Corp., Loveland, CO (US)

( * ) Notice: Subject to any disclaimer, the term of this patent is extended or adjusted under 35 U.S.C. 154(b) by 100 days.

(21) Appl. No.: 15/295,668

(22) Filed: Oct. 17, 2016

Related U.S. Application Data (60) Provisional application No. 62/356,389, filed on Jun. 29, 2016.

(51) Int. Cl.

| | |
|---|---|
| *A01G 9/20* | (2006.01) |
| *F21K 9/64* | (2016.01) |
| *H05B 33/08* | (2006.01) |
| *F21V 9/08* | (2018.01) |
| *A01G 7/04* | (2006.01) |
| *A01G 9/26* | (2006.01) |
| *F21Y 115/10* | (2016.01) |

(52) U.S. Cl.
CPC ............... *A01G 9/20* (2013.01); *A01G 7/045* (2013.01); *A01G 9/26* (2013.01); *F21K 9/64* (2016.08); *F21V 9/08* (2013.01); *H05B 33/0845* (2013.01); *H05B 33/0857* (2013.01); *F21Y 2115/10* (2016.08)

(58) Field of Classification Search
CPC ...... A01G 9/20; A01G 7/045; H05B 33/0845; H05B 33/0857; H05B 33/086; H01L 33/502; H01L 33/504
See application file for complete search history.

(56) References Cited

U.S. PATENT DOCUMENTS

| | | | |
|---|---|---|---|
| 6,921,182 | B2 | 7/2005 | Anderson, Jr. et al. |
| 8,523,385 | B2 | 9/2013 | Lu et al. |
| 9,060,468 | B2 | 6/2015 | Klase et al. |

(Continued)

FOREIGN PATENT DOCUMENTS

| | | |
|---|---|---|
| CN | 202043326 U | 11/2011 |
| CN | 102630511 A | 8/2012 |

(Continued)

OTHER PUBLICATIONS

Emerson, Dependence of Yield of Photosynthesis in Long-Wave Red on Wavelength and Intensity of Supplementary Light (abstract only). National Academy of Sciences, Abstracts of Papers to be Presented at the Annual Meeting, Apr. 22-24, 1957, Washington DC. 1 page.

(Continued)

*Primary Examiner* — Bao Q Truong
*Assistant Examiner* — Steven Horikoshi
(74) *Attorney, Agent, or Firm* — Santangelo Law Offices, P.C.

(57) ABSTRACT

The present invention provides a dynamically engaged plant stimulation lighting system and methods for growing plants. Specific wavelengths may be provided in the system along with specific color temperature and even specific color rendering index values for optimal plant growth.

24 Claims, 3 Drawing Sheets

(56) References Cited

U.S. PATENT DOCUMENTS

| | | |
|---|---|---|
| 9,282,698 B2 | 3/2016 | Beyer |
| 2009/0288340 A1 | 11/2009 | Hess |
| 2010/0020536 A1* | 1/2010 | Bafetti .................. F21V 23/003 362/231 |
| 2010/0287830 A1* | 11/2010 | Chen ...................... A01G 7/045 47/58.1 LS |
| 2012/0020071 A1 | 1/2012 | McKenzie |
| 2012/0104977 A1 | 5/2012 | McKenzie et al. |
| 2012/0170264 A1 | 7/2012 | McKenzie et al. |
| 2013/0318869 A1* | 12/2013 | Aikala ................... A01G 7/045 47/58.1 LS |
| 2014/0259920 A1 | 9/2014 | Wilson |
| 2016/0178179 A1 | 6/2016 | Hanson et al. |
| 2016/0184237 A1 | 6/2016 | Lowe et al. |
| 2016/0192598 A1 | 7/2016 | Haggarty |
| 2016/0338168 A1* | 11/2016 | Rantala .............. H05B 33/0857 |
| 2018/0054974 A1* | 3/2018 | Vasilenko .............. A01G 7/045 |

FOREIGN PATENT DOCUMENTS

| | | |
|---|---|---|
| CN | 104748073 A | 7/2015 |
| WO | 2012154278 A1 | 11/2012 |
| WO | 2014188303 A1 | 11/2014 |
| WO | 2016044541 A1 | 3/2016 |
| WO | 2016054268 A1 | 4/2016 |

OTHER PUBLICATIONS

Walker, et al. Two Spectrally Different Forms of the Phytochrome Chromophore Extracted from Etiolated Oat Seedlings. Biochem. J. (1968) 107, 603. pp. 603-605.

Gururani, et al. Photo-biotechnology as a tool to improve argonomic traits in crops. Biotechnology Advances 33 (2015) 53-63.

U.S. Appl. No. 62/356,389, filed Jun. 29, 2016. First named inventor: Nathan Carlie.

* cited by examiner

DYNAMIC PLANT LIGHTING SYSTEMS AND METHODS

PRIORITY CLAIM

This application is a U.S. Non-Provisional claiming priority to and the benefit of U.S. Provisional Application No. 62/356,389 filed Jun. 29, 2016 hereby incorporated by reference herein.

BACKGROUND

The indoor growing of plants may be preferred to outdoor methods when space is limited, the length of the growing season is too short or even when environmental conditions are unsuitable. This may also allow the opportunity to limit exposure to pests and diseases. However, these advantages come with a significant added cost of providing sufficient light intensity and the required energy. Of the commonly available lighting technologies, light emitting diodes (LEDs) are the most efficient, but the spectrum of energy versus wavelength is often incorrect for optimal plant health and growth rate.

Recently, new phosphors have been developed for the efficient conversion of blue LED light into longer wavelengths with a better match to plant requirements, having significant emission beyond 600 nm. However, it is not possible to adjust the spectrum of these lights throughout the day and over the growing season. In addition, there are benefits to the use of wavelengths both above and below the wavelengths which are visible to the human eye, for which there are no efficient phosphors. Several lighting systems have been developed using multiple LED types, which allow different wavelengths to be combined, but these systems do not incorporate the full spectrum of usable wavelengths, nor do they allow flexible control over spectral intensity throughout the day and over the growing season.

Figure 1:
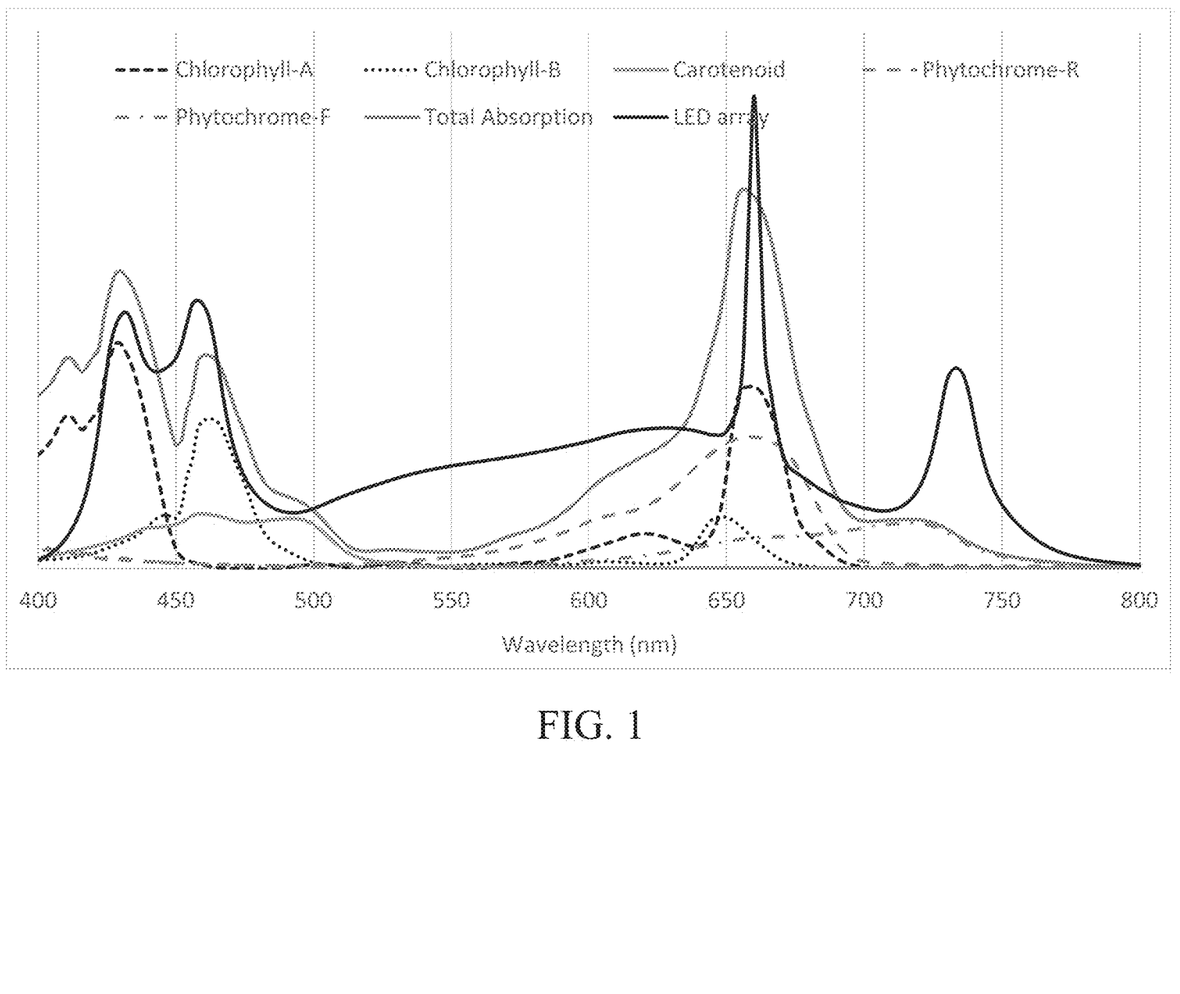
FIG. 1 shows the absorption spectra of several important phytochemicals along with the emission spectrum of the LED light described in the various embodiments of the present invention.

As shown in FIG. 1, several important light absorbing chemicals may be stimulated using different wavelengths of light. The chemicals most responsible for converting light energy in the chemical energy to fuel growth are chlorophyll A and B which may be present in different amounts, depending on the plant species and growing conditions. The energy production process may also be assisted by accessory pigments such as carotenoids and phycocyanins. The light absorption of chlorophyll-a is centered around about 430 and about 660 nm, but chlorophyll-b in centered around about 460 and about 650 nm. By providing two channels of blue light at about 430 and about 460 nm the grower can tune the spectrum to the ratio of A to B chlorophyll absorption required. While aquatic plants and corals can grow well with little to no input of light near about 660 nm, these organisms have adapted to an environment which is low in red light due to absorption by the water column above. Terrestrial pants are known to prosper in light which is stronger in red than in blue wavelengths, which is often accomplished by the addition of light near about 660 nm. This is also able to stimulate both chlorophylls and improves the production of energy, increasing plant yield.

It was shown first by Emerson, in 1957 [Emerson, Robert (1957). "Dependence of yield of photosynthesis in long wave red on wavelength and intensity of supplementary light". Science 125: 746] that the exposure of plants to wavelengths beyond about 700 nm, which were not thought at the time to be involved in photosynthesis, resulted in a significant increase in the rate of energy production. It was later discovered that the chemical phytochrome absorbs light near about 660 nm and undergoes a chemical transformation to a form that absorbs light near about 730 nm, and upon the absorption of light near about 730 nm, this transformation is reversed [Walker T S, Bailey J L. Two spectrally different forms of the phytochrome chromophore extracted from etiolated oat seedlings. Biochem J. 1968 April; 107(4):603-605]. The relative concentrations of the red-absorbing (PR) and Far-red absorbing (PFR) forms acts as a signaling mechanism which can inform the plant as to the time of dusk and dawn and to the length of the daylight period. This can in turn be used not only to increase photosynthetic rates, but also to control the growth habit of plants or to control their flowering behavior [Gururani, Mayank Anand, Markkandan Ganesan, and Pill-Soon Song. "Photo-biotechnology as a tool to improve agronomic traits in crops." Biotechnology Advances (2014)].

DETAILED DESCRIPTION OF THE PREFERRED EMBODIMENTS

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

The lighting system described herein consists of a variety of LED emitters which may be energized electrically either under varying continuous current, or even via pulsed current where the duty cycle may be varied. This may allow the average output intensity be varied. Multiple emitters of each type may be arranged into a series circuit and the various series of emitters may be arranged into a plurality of parallel circuits, referred to herein as channels, the average current of which may be individually adjustable, perhaps allowing the output energy spectrum to be varied via digital or analog controls. A timing circuit may be used, which may be analog or digital, and which may allow the intensity of each channel to be adjusted perhaps so as to allow the length of time for bright and dark cycles to be adjusted.

In some embodiments of the present invention, at least three channels may be required. Of course less than three channels may be utilized in other embodiments. The first of these channels may be a broad-band white light emitter perhaps with a color-rendering index (CRI) of at least about 92 and an effective color temperature in the range of between about 3500 to about 5000 Kelvin. The purpose of this broad-band white channel may be to provide a simple mechanism for inspecting organisms under lighting which may simulate sunlight in appearance. A secondary benefit may be to provide photons of a wavelength suitable for exciting carotenoids, phycocyanins, and other accessory pigments as well as any potentially unknown beneficial phytochemicals. The second channel may include one or more emitters with a peak wavelength of between about 410 to about 440 nm, or even from about 420 to about 440 nm, perhaps corresponding to the peak absorption of chlorophyll-a. In addition, the high photon energy of these wavelengths may contribute antibiotic activity, which may help protect the organisms from infection. The third channel may include one or more emitters with a peak wavelength in the range of between about 700 to about 750 nm, which may allow the use of the Emmerson effect, as described in reference 1, perhaps increasing photosynthetic yield. Because the intensity of each channel may be controlled over time, it may be possible to also prevent or induce flowering by terminating this infrared either before or after the end of photoperiod.

A common method of creating a high-CRI neutral white emission may include using a blue-emitting LED with a peak intensity in the range of about 440-about 460 nm. The light from this emitter may be caused to interact with at least two wavelength-conversion phosphors generating broad emissions with maxima in the range of about 530 to about 600 nm and about 630 to about 670 nm. This is because the emission bandwidth of an individual phosphors may not typically be sufficient to provide both high CRI (>about 95) and neutral color temperature (about 3500K-about 5000K) simultaneously. However, multiple emitters may alternatively be combined in an array to achieve these requirements. In embodiments, the present invention may provide an array of emitters combining high color temperature white LED emitters (>about 5000K) having CRI of about 70-about 90 and an emission maximum in the range of about 530 to about 600 nm, with an LED of low color temperature (<about 3500K), having a CRI of at least about 95 and an emission maximum in the range of about 630 to about 670 nm. This embodiment has the advantage of allowing the number of emitters or driving current of the different emitter types to be adjusted perhaps in order to tune the spectral character of the light. The strong emissions provided near about 460 nm and about 660 nm in these embodiments also allow efficient conversion of electrical energy to chemical energy via photosynthesis.

In other embodiments, one or more emitters having a color temperature in the range of about 3500-about 5000K and a CRI of about 70-about 90 may be combined with one or more emitters with peak intensity in the range of about 410-about 440 nm or perhaps in the range of about 420 to about 430 nm and one or more emitters having a peak emission intensity in the range of about 650 to about 670 nm. Additional emitters in the range of about 700 to about 750 nm may be added. This arrangement may allow high photosynthetic-electrical efficiency and even a neutral white appearance with CRI >about 95 to be achieved while having a reduced complexity. In yet another embodiment, a combination of three or more narrow band or even fully phosphor-converted colored emitters may be used which meet the color temperature and CRI requirements as an ensemble. This combination may provide lower energy efficiency and may be less beneficial to organisms but can provide a method for visual inspection.

In an alternative embodiment, emitters having peak intensity in the range of about 350 to about 410 nm may be added in order to increase the anti-biotic effects of radiation at wavelengths below about 450 nm. Many organisms also generate desirable compounds on interaction with ultraviolet light as a protective mechanism, which may be enhanced by the addition of these shorter wavelengths. This may be achieved by replacing one or more emitters in the three channels as discussed herein or even by adding an additional control channel. In an another embodiment, additional channels near about 460 nm or even about 660 nm may also be added either in place of or in addition to the ultraviolet channel. These may have the influence of increasing photosynthetic output and increasing electrical efficiency by corresponding to the strongest absorptions of chlorophyll-b, perhaps achieving a higher growth rate for a given electrical input.

By adjusting the output of the ultraviolet and/or blue channels relative to the white and/or red channels, the color temperature may be adjusted throughout the photoperiod and over the course of multiple days. This can allow effective duplication of natural phenomena, such as the spectrum of light present near sunset and sunrise or over different seasons of the year. This can have further benefits, for example in the agriculture of fruiting or flowering plants or in propagation of aquatic organisms such as corals. The aspect of individual control over light intensity of each channel over time is critical to the realization of these benefits. In the embodiments, the total intensity of each channel may therefore be adjusted over time, either manually or by analog automation or digital computer control. The intensity of the channel having peak emission beyond about 700 nm can be dimmed either before or even after the other channels have been adjusted to a minimum intensity, perhaps allowing the flowering behavior to be controlled. This channel may be used to simulate the lunar illumination cycle over a period of about 28 to about 30 days.

Embodiments of the present invention may include a dynamically engaged plant stimulation lighting system (1) comprising at least one light emitting diode (2) capable of providing at least four emission spectra (3), said emission spectra comprising: at least one ultra violet wavelength between about 420 and about 425 nm; at least one blue wavelength at about 460 nm; at least one red wavelength at about 660 nm; and at least one infrared wavelength between about 720 and about 740 nm; wherein said at least one light emitting diode is capable of providing a color temperature between about 3500K and about 5000K; wherein said at least one light emitting diode is capable of providing a color rendering index between about 70 and about 100; and a variable output intensity control (4) capable of varying each of said four emission spectra output intensity.

Figure 2:
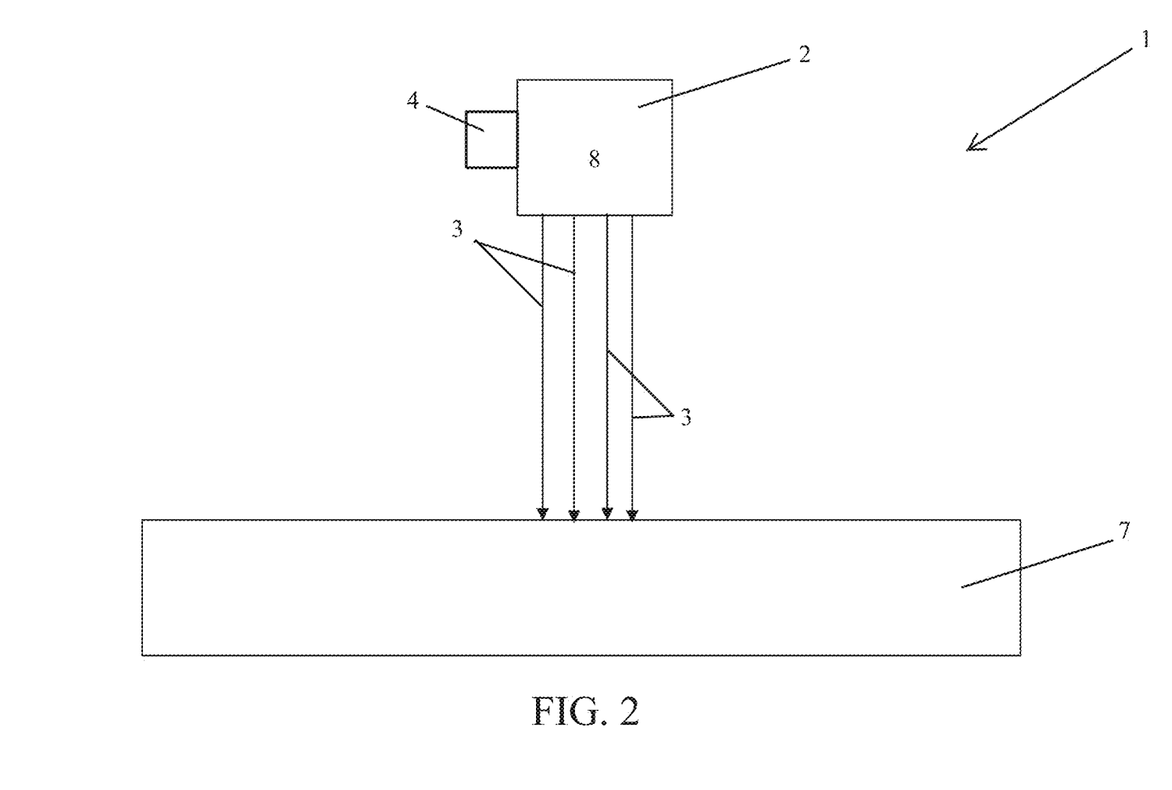
FIG. 2 shows an exemplary example of a system in accordance with the various embodiments of the present invention.
Figure 3:
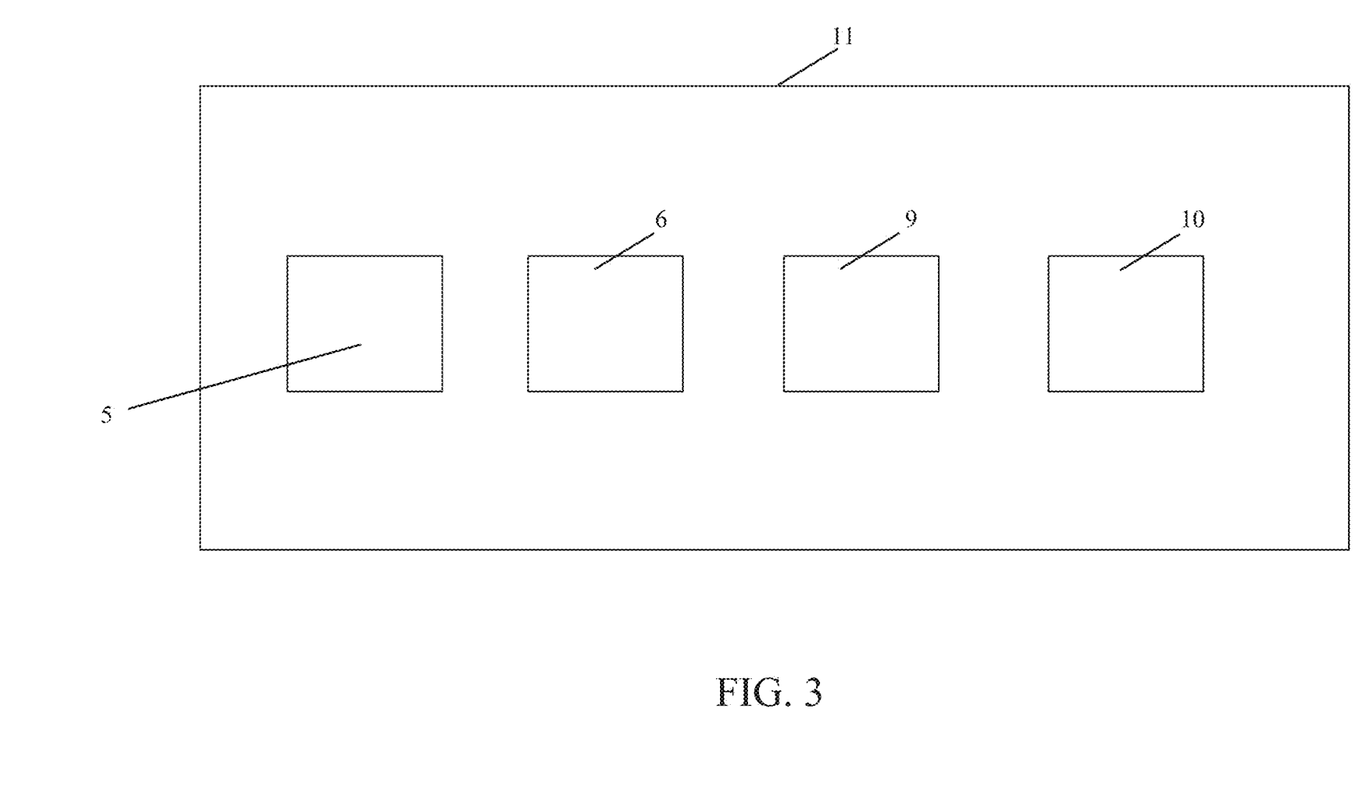
FIG. 3 shows another exemplary example of a system in accordance with the various embodiments of the present invention.

As shown in FIG. 2, plant stimulation lighting system (1) may include at least one light emitting diode (2) that may provide emission spectra (3). In various embodiments, the emission spectra (3) may vary and may be at least one, at least two, at least three, at least four, three, four, more than three, more than four, at least five, or the like. The emission spectra may be simultaneous, may be alternating, may be continuous, may be pulsed, or the like. The emission spectra output intensity may be controlled with a variable output intensity control (4) which may vary the spectra. A variable output intensity control may include a manual control, an analog control, a digital computer control, or the like. A system (11) may provide an event time (5) which may allow for a specific time and even length of time for a certain wavelength to be applied to a set of plants perhaps located in a plant base (7). A system may even include a predetermined schedule (6) for said event times and other scheduling for spectral emissions for an array of plants. For example, an event time for an infrared wavelength such as between about 720 nm and about 730 nm may be about 15 minutes at the beginning and even at the end of a light cycle. In general, certain plants may have specific event times tailored for that type of plant.

Various lighting systems and methods may be developed for optimal growing of certain types of plants. For example, some of the embodiments discussed herein may apply to efficient growing of cannabis plants. Of course, other types of plants may be used. A system (11) may also provide a desired color temperature (9) or a desired color rendering index (10). A system may be adjusted to provide the specific variables. An at least one light emitting diode may include phosphored-converted colored emitters (8).

In some embodiments, at least one light emitting diode may include at least two light emitting diodes grouped by emission spectra and the groups may be separately connected together into a circuit to form at least one spectral channel. Various spectral channels/emission wavelengths may be used in desired systems. For example, at least one spectral channel may be individually controlled perhaps even where an output intensity of at least one spectral channel may not affect an intensity of at least one other channel. One of said spectral channels may have at least one light emitting diode emitter with a broad emission spectrum in the wavelength range of about 440 nm to about 700 nm and at least one additional channel may have at least one light emitting diode emitter having an emission in the wavelength range of about 700 nm to about 750 nm. One spectral channel may be configured to provide a color rendering index of at least 90 and perhaps even a color temperature of between about 3500 K to about 5000 K. One spectral channel may include at least two types of types of emitters which may provide light between about 360 nm and about 500 nm which may be converted to a longer wavelength using a phosphor. One spectral channel may include a single type of emitter which may provide light between about 400 nm and about 500 nm which may be converted to a longer wavelength perhaps using at least two phosphors. An additional channel may have an emission wavelength between about 420 nm and about 440 nm or between about 360 nm and about 440 nm or the like. At least two additional channels may have a first emission wavelength between about 360 nm and 420 nm and a second emission wavelength between 420 nm and about 440 nm. An additional channel may have an emission wavelength between about 440 nm and about 480 nm; or between about 600 nm and about 670 nm, or the like. At least two additional channels may have a first emission wavelength between about 440 nm and about 480 nm and a second emission wavelength between 600 nm and about 670 nm. An emission wavelength that may have been between about 440 nm and about 700 nm may be replaced by a channel having an emission wavelength between about 500 nm and about 650 nm. One spectral channel may have about three spectral channels which include emitters having an emission wavelength comprising between about 440 nm and about 480 nm, between about 500 nm and about 600 nm, and between about 620 nm and about 670 nm. A channel may have an emission wavelength between about 700 nm and about 750 nm.

In some embodiments, a method of providing a dynamically engaged plant stimulation lighting may include but is not limited to providing at least one light emitting diode; providing at least four emission spectrum comprising: at least one ultra violet wavelength between about 420 and about 425 nm; at least one blue wavelength at about 460 nm; at least one red wavelength at about 660 nm; and at least one infrared wavelength between about 720 and about 740 nm; providing a color temperature between about 3500K and about 5000K; providing a color rendering index between about 70 and about 100; and perhaps even variably controlling an output intensity of each of said at least four emission spectra.

In embodiments, the control of channels over time may prevent or even induce flowering such as with the use of infrared before and/or even after the end of the photoperiod. The present invention may provide use of infrared for internal node spacing to keep plants at a manageable plant height and control blooming cycles. In other embodiments, the about 420 and about 460 wavelengths may be used as the controls for the system.

As can be easily understood from the foregoing, the basic concepts of the present invention may be embodied in a variety of ways. It involves both lighting techniques as well as devices to accomplish the appropriate light. In this application, the lighting techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "plant light" or "plant lighting" should be understood to encompass disclosure of the act of "lighting"—whether explicitly discussed or not—and, conversely, were there effectively disclosure of the act of "lighting", such a disclosure should be understood to encompass disclosure of a "light" and even a "means for lighting." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the information disclosure statement or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the lighting devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims. With respect to the use of "about" that may include +/−5 to 10 or more.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A dynamically engaged cannabis plant stimulation lighting system comprising:
   at least one light emitting diode capable of providing at least four emission spectra to cannabis plants, said emission spectra comprising:
      at least one ultra violet wavelength between about 420 and about 425 nm;
      at least one blue wavelength at about 460 nm;
      at least one red wavelength at about 660 nm; and
      at least one infrared wavelength between about 720 nm and about 740 nm;
   wherein said at least one light emitting diode is capable of providing a color temperature between about 3500K and about 5000K to said cannabis plants;
   wherein said at least one light emitting diode is capable of providing a color rendering index between about 70 and about 100 to said cannabis plants; and
   a variable output intensity control capable of varying each of said four emission spectra output intensity; and
   an event time for each of said emission spectra, wherein said event time for said infrared wavelength between about 720 and about 740 nm is about 15 minutes at the beginning and at the end of a light cycle.

2. A dynamically engaged cannabis plant stimulation lighting system according to claim 1 and further comprising a predetermined schedule for said event times of each of said emission spectra.

3. A dynamically engaged cannabis plant stimulation lighting system according to claim 1 and further comprising a cannabis plant base positioned under said lighting system.

4. A dynamically engaged cannabis plant stimulation lighting system according to claim 1 wherein said at least one light emitting diode comprises at least four narrow bands of light.

5. A dynamically engaged cannabis plant stimulation lighting system according to claim 1 wherein said at least one light emitting diode comprises phosphored-converted colored emitters.

6. A dynamically engaged cannabis plant stimulation lighting system according to claim 1 wherein said color rendering index is selected from a group consisting of:
   about 92;
   between about 70 and about 90; and
   at least 95.

7. A dynamically engaged cannabis plant stimulation lighting system according to claim 1 wherein said at least one light emitting diode emitter comprises a continuous current.

8. A dynamically engaged cannabis plant stimulation lighting system according to claim 1 wherein said at least one light emitting diode emitter comprises a pulsed varying duty cycle.

9. A dynamically engaged cannabis plant stimulation lighting system according to claim 1 wherein said at least one light emitting diode comprises at least one blue emitting light emitting diode.

10. A dynamically engaged cannabis plant stimulation lighting system according to claim 1 wherein said at least one light emitting diode comprises at least two light emitting diodes grouped by emission spectra, wherein said groups are separately connected together into a circuit to form at least one spectral channel.

11. A dynamically engaged cannabis plant stimulation lighting system according to claim 10 wherein said at least one spectral channel is individually controlled, wherein said output intensity of said at least one spectral channel does not affect an intensity of at least one other channel.

12. A dynamically engaged cannabis plant stimulation lighting system according to claim 11 wherein one of said spectral channels comprises at least one light emitting diode emitter having a broad emission spectrum in the wavelength range of about 440 nm to about 700 nm, and said at least one additional channel comprises at least one light emitting diode emitter having an emission in the wavelength range of about 700 nm to about 750 nm.

13. A dynamically engaged cannabis plant stimulation lighting system according to claim 12 wherein said one spectral channel is configured to provide a color rendering index of at least 90 and a color temperature of between about 3500 K to about 5000 K.

14. A dynamically engaged cannabis plant stimulation lighting system according to claim 12 wherein said one spectral channel comprises at least two types of types of emitters configured to provide light between about 360 nm and about 500 nm converted to a longer wavelength using a phosphor.

15. A dynamically engaged cannabis plant stimulation lighting system according to claim 12 wherein said one spectral channel comprises a single type of emitter configured to provide light between about 400 nm and about 500 nm converted to a longer wavelength using at least two phosphors.

16. A dynamically engaged cannabis plant stimulation lighting system according to claim 15 and further comprising an additional channel having an emission wavelength selected from a group consisting of: between about 440 nm and about 480 nm; and between about 600 nm and about 670 nm.

17. A dynamically engaged cannabis plant stimulation lighting system according to claim 15 and further comprising at least two additional channels having a first emission wavelength between about 440 nm and about 480 nm and a second emission wavelength between 600 nm and about 670 nm.

18. A dynamically engaged cannabis plant stimulation lighting system according to claim 12 wherein said channel comprising an emission wavelength between about 440 nm and about 700 nm is replaced by a channel having an emission wavelength between about 500 nm and about 650 nm.

19. A dynamically engaged cannabis plant stimulation lighting system according to claim 11 wherein said at least one spectral channel comprises three spectral channels comprising emitters having an emission wavelength comprising between about 440 nm and about 480 nm, between about 500 nm and about 600 nm, and between about 620 nm and about 670 nm.

20. A dynamically engaged cannabis plant stimulation lighting system according to claim 10 and further comprising an additional channel having an emission wavelength comprising between about 360 nm and about 440 nm.

21. A dynamically engaged cannabis plant stimulation lighting system according to claim 10 and further comprising at least two additional channels having a first emission wavelength between about 360 nm and 420 nm and a second emission wavelength between about 420 nm and about 440 nm.

22. A dynamically engaged cannabis plant stimulation lighting system according to claim 1 wherein said variable output intensity control comprises a control selected from a group consisting of: manual control, analog control, and digital computer control.

23. A method of providing a dynamically engaged cannabis plant stimulation lighting to plants comprising the steps of:
    providing at least one light emitting diode;
    providing at least four emission spectrum comprising:
        at least one ultra violet wavelength between about 420 and about 425 nm;
        at least one blue wavelength at about 460 nm;
        at least one red wavelength at about 660 nm; and
        at least one infrared wavelength between about 720 and about 740 nm;
    providing a color temperature between about 3500K and about 5000K;
    providing a color rendering index between about 70 and about 100;
    variably controlling an output intensity of each of said at least four emission spectra;
    providing an event time for each of said emission spectra, wherein said event time for said infrared wavelength between about 720 and about 740 nm is about 15 minutes at the beginning and at the end of a light cycle; and
    efficiently growing a cannabis plant with said at least four emission spectrum, said color temperature and said color rendering index.

24. A method according to claim 23 wherein said step of variably controlling said output intensity of each of said four emission spectra comprises the step of controlling with an element selected from a group consisting of manually controlling, analog controlling, and digital computer controlling.

* * * * *